UNITED STATES PATENT OFFICE.

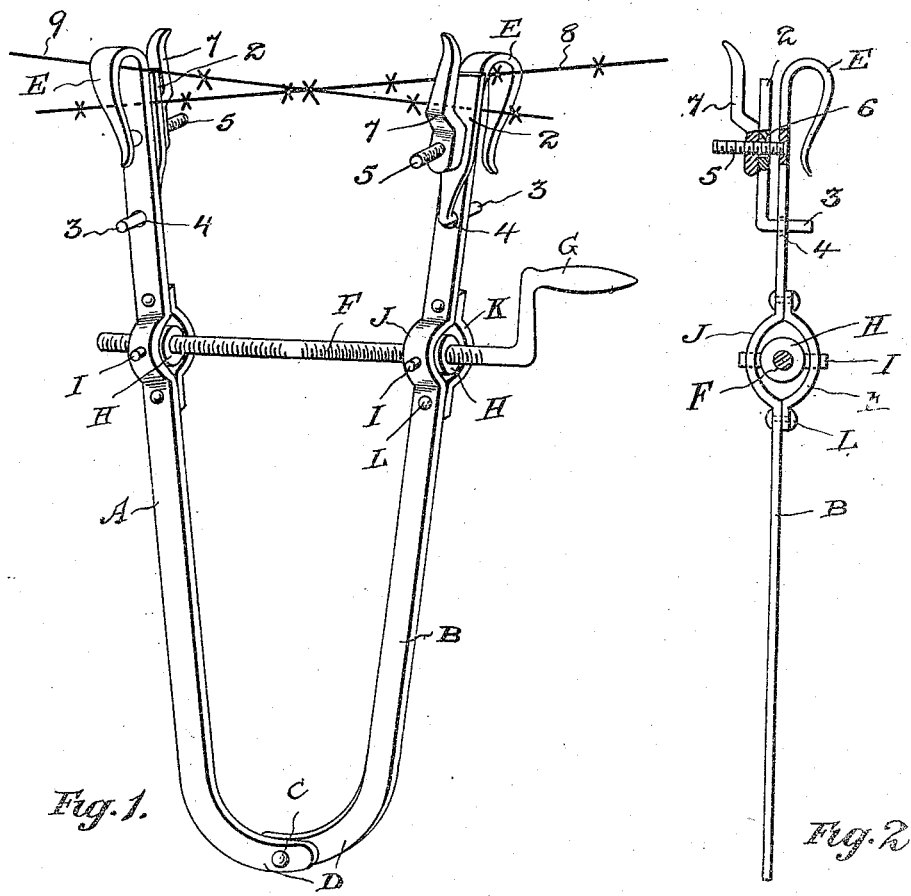

CHRISTIAN FRANCIS TOLLESTRUP, OF RAYMOND, ALBERTA, CANADA.

WIRE STRETCHER AND SPLICER.

1,250,245.   Specification of Letters Patent.   Patented Dec. 18, 1917.

Application filed April 9, 1917. Serial No. 160,833.

*To all whom it may concern:*

Be it known that I, CHRISTIAN FRANCIS TOLLESTRUP, of the town of Raymond, in the Province of Alberta, Canada, a citizen of the United States of America, have invented certain new and useful Improvements in Wire Stretchers and Splicers, of which the following is a specification.

My invention relates to improvements in wire stretchers and splicers, and relates more particularly to the production of a tool used in connection with the repairing of barbed-wire fences, and the principal object of my invention is to produce a device of this class which while yet efficient and durable, will be comparatively cheap to manufacture. Broadly considered the device comprises two members suitably coupled together at their lower ends, the upper ends of said members being provided with eyes; clamping means carried by each of the said members in the vicinity of said eyes, a threaded crank co-acting with means carried by each of the said members, whereby the said members are opened or closed as hereinafter more particularly explained.

Figure 1 is a perspective view of my device, showing the same in position for use, and Fig. 2 is an end elevation of one of the members, certain parts being shown in section.

In the drawings, like characters of reference refer to same parts.

A and B are two members in the form of arms and the same are suitably hinged together at their lower ends, as shown at C. The lower ends of said arms are preferably curved, as shown at D so as to be off-set from the main portion of the arms, thus enabling me to secure coöperation between the said arms, and the members carried thereby in the most advantageous manner.

The upper end of each of the arms is provided with an open eye E, formed in opposite directions. I preferably bend the upper ends of said arms to form said eyes. These said eyes are slipped over the two ends of the wires as shown in Fig. 1, so that when the wires are placed under tension, the device will be held from twisting movement. F is a threaded crank of which G is the handle. This threaded crank is provided with right and left-hand threads as shown, and the same is held in nuts H. These nuts are provided with trunnions I, and the said trunnions are suitably carried by the said arms. My preferred construction for mounting these trunnions in place is to form each arm with an off-set portion J, in which one of the trunnions of each nut, has bearing, and curved plates K support the other trunnions. These curved plates are suitably secured to their respective arms, opposite the off-set portions J, by any suitable means, such as rivets L. The nut carried by the arm B is provided with a right-hand thread, and the nut carried by the arm A is provided with a left-hand thread. The said nuts, with their trunnions, provide the crank F with swivel bearings in the said arms. Any suitable clamping means may be provided to clamp the wire to each of the said arms. My preferred form of clamping means used with each arm, comprises a clamp 2 provided with a tail 3 which operates through a hole 4 formed in each of the said arms. The said tails are substantially formed at right angles to the said clamps so that the said clamps may be adjusted readily in respect of their associated arms. Suitably carried by each of the said arms is a stud 5, which passes through a hole 6 formed in each clamp 2. 7 is a tail-nut co-acting with the said studs to actuate the said clamps. In order to use the device, the eyes E are placed over the ends of the wire as shown, and the wire between the clamps 2 of the said arms. Through the medium of the tail-nut 7, the clamps 2 jam the wires tightly against the arms and so hold them in position. It will be noticed that the wire 8 passes through the eye of the arm B, and is clamped between the arm A and the clamp 2 carried thereby, whereas the wire 9 passes through the eye of the arm A and is held in place by the clamp 2 carried by the arm B. By turning the handle G to the left, the arms A and B are moved toward each other, and the device is then positioned as illustrated and described. In order to place the said wires under tension, the handle G is turned to the right, thus the said arms are forced apart. So soon as the wires have been made sufficiently taut, any suitable instrument is placed between them intermediate the said eyes E and turned so as to twist these wires together. Without further description it will be understood how the device is removed.

It will be understood by one skilled in this art that before two wires can be joined together, their ends must overlap, and if this be not the case, then a piece of wire must be coupled to either of the wires 8 or 9, as will be understood.

This tool of mine may be readily used to tighten up slack wire, so that the slack portion of the wire between the eyes may be twisted to place the wires under permanent tension.

The said clamps 2 are supported so as to have freedom of movement.

While I have described what I consider to be the best embodiment of my invention, I desire it to be understood that the principle can be embodied in different forms, and I desire not to be limited beyond the requirements of the prior art, and the terms of my claims.

Claims.

1. A device of the class described comprising two arms movably coupled together at their lower ends, each arm being provided at its upper end with an open eye; adjustable clamping means carried by each of the said arms at their upper ends; a crank provided with right-hand and left-hand threads, and threaded swivels carried one by each of the said arms in which the said threaded crank has bearing, the whole combined to operate as set forth.

2. A device of the class described comprising two arms the lower ends of which are off-set, and are pivoted together; an open eye carried by the upper end of each of said arms; the said eyes facing in opposite directions; adjustable clamping means carried by each of the said arms at their upper ends; a crank provided with right-hand and left-hand threads; and threaded swivels each comprising a suitably threaded nut which is provided at each side with a trunnion, the said threaded crank operating through said threaded nuts, and means whereby said trunnions are mounted to have bearing in their respective arms.

CHRISTIAN FRANCIS TOLLESTRUP.

Copies of this patent may be obtained for five cents each, by addressing the "Commissioner of Patents, Washington, D. C."